(12) United States Patent
Miyazaki

(10) Patent No.: US 9,497,430 B2
(45) Date of Patent: Nov. 15, 2016

(54) OPTICAL WHEEL DEVICE AND PROJECTION SYSTEM

(71) Applicant: CASIO COMPUTER CO., LTD., Tokyo (JP)

(72) Inventor: Takeshi Miyazaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 254 days.

(21) Appl. No.: 14/290,208

(22) Filed: May 29, 2014

(65) Prior Publication Data

US 2014/0354960 A1    Dec. 4, 2014

(30) Foreign Application Priority Data

May 30, 2013  (JP) ................................ 2013-113616
Mar. 19, 2014  (JP) ................................ 2014-056362

(51) Int. Cl.
*G03B 21/14* (2006.01)
*H04N 9/31* (2006.01)
*G02B 26/00* (2006.01)
*G02B 27/09* (2006.01)

(52) U.S. Cl.
CPC ........... *H04N 9/3114* (2013.01); *G02B 26/008* (2013.01); *H04N 9/3111* (2013.01); *G02B 27/0905* (2013.01)

(58) Field of Classification Search
CPC ........ G03B 21/14; G03B 21/00; H04N 9/31; H04N 5/74; G02B 26/00
See application file for complete search history.

(56) References Cited

U.S. PATENT DOCUMENTS

| | | |
|---|---|---|
| 6,754,014 B1 | 6/2004 | Chin et al. |
| 2002/0180938 A1* | 12/2002 | Bok .................. G03B 21/16 353/52 |
| 2005/0109154 A1* | 5/2005 | Chang ............... F16F 15/363 353/84 |
| 2005/0168857 A1* | 8/2005 | Lee .................... G02B 26/008 359/892 |
| 2006/0227442 A1* | 10/2006 | Hsu .................... G03B 33/08 359/892 |
| 2009/0021851 A1* | 1/2009 | Janicek ............. G02B 26/008 359/892 |
| 2012/0242912 A1* | 9/2012 | Kitano ............... H04N 9/3111 348/759 |

FOREIGN PATENT DOCUMENTS

JP    2004-197922 A    7/2004

OTHER PUBLICATIONS

Office Action dated Aug. 5, 2015 in Application No. 201410232014.6 from State Intellectual Property Office of People's Republic of China.

* cited by examiner

*Primary Examiner* — Sultan Chowdhury
*Assistant Examiner* — Danell L Owens
(74) *Attorney, Agent, or Firm* — Scully, Scott, Murphy & Presser, P.C.

(57) ABSTRACT

There is provided an optical wheel device including a motor, a wheel holding member which is fixed to a motor shaft of the motor and which has a recess portion on a surface which is normal to the motor shaft, an optical wheel which is fixed to a surface of the wheel holding member which is opposite to a surface facing the motor, and a collective lens which is disposed in the proximity to the optical wheel on a side of the optical wheel which is opposite to a side facing the motor, wherein a distal end face of a projecting portion on the wheel holding member which projects towards a side of the collective lens is positioned closer to a side of the motor than a plane of a surface of the collective lens which faces the motor.

20 Claims, 12 Drawing Sheets

OPTICAL WHEEL DEVICE AND PROJECTION SYSTEM

CROSS-REFERENCE TO RELATED APPLICATION

This application is based upon and claims the benefit of priority under 35 USC 119 to Japanese Patent Application No. 2013-113616 filed on May 30, 2013, and Japanese Patent Application No. 2014-56362 filed on Mar. 19, 2014, the entire disclosures of which, including the descriptions, claims, drawings and abstracts, are incorporated herein by reference.

BACKGROUND OF THE INVENTION

Field of the Invention

The present invention relates to an optical wheel device and a projection system (projector) which includes the optical wheel device.

Description of the Related Art

In these days, data projectors are used on many occasions as an image projection system which projects images including an image of a monitor of a personal computer and a video image, as well as images based on image data which is stored on a memory card on to a screen.

In these data projectors, light emitted from a light source is caused to converge to a micromirror display device called a DMD (Digital Micromirror Device) or a liquid crystal panel so that a full-color image is displayed onto a screen.

In addition, the application of such projectors is expanding widely from commercial presentation to domestic use as video equipment including personal computers, DVD players and the like has been used generally.

Conventionally, the mainstream of these projectors has been those which utilize a high-intensity discharge lamp as a light source. In recent years, however, there have been made many developments and proposals on light source apparatuses which use, as a light source, a plurality of semiconductor light emitting elements such as laser diodes and which include a plurality of optical parts such as lenses, mirrors and the like in association with the use of such semiconductor light emitting elements.

For example, a light source unit has been proposed which includes an excitation light source which emits light of a blue wavelength range by using a laser diode, and an optical wheel (a rotary plate) which has a layer of luminescent material which absorbs light emitted from the excitation light source to convert it into visible light and which is driven to rotate by a motor, and a projector which includes this light source unit has been proposed.

Japanese Unexamined Patent Publication (KOHKAI) No. 2004-197922 (JP-2004-197922 A) discloses a rotary disc like a color wheel which can remove vibrations thereof effectively by containing a curable liquid in a dish-shaped container which is provided in the rotary disc to balance the weight of the rotary disc when it is rotating to thereby suppress the vibrations thereof.

However, JP-2004-197922 A above proposes the configuration in which the dish-shaped container is provided to connect the color wheel to a distal end of a rotating shaft, and an adhesive is poured into the container. Due to the provision of the container, in disposing a collective lens which collects efficiently excitation light to an excitation light source side of the color wheel or the like, the collective lens has to be disposed while ensuring spaces for a lens unit and the container.

Consequently, it is difficult to shorten a distance between the collective lens and the color wheel, resulting in a problem that the wheel device has to be made large in size.

SUMMARY OF THE INVENTION

The invention has been made in view of the problem inherent in the related art of optical wheel devices, and an object of the invention is to provide an optical wheel device which is small in size and light in weight and a projector which uses the optical wheel device.

According to a first aspect of the invention, there is provided an optical wheel device including a motor, a wheel holding member which is fixed to a motor shaft of the motor and which has a recess portion, which is centered at the motor shaft, on a surface which is normal to the motor shaft, an annular optical wheel which is fixed to a surface of the wheel holding member which lies opposite to the surface which faces the motor, and a collective lens which is disposed near the optical wheel and on an opposite side to the motor, wherein the wheel holding member includes a projecting portion which projects in the direction of a side on which the collective lens is disposed, and a distal end face of the projecting portion is situated closer to the motor side than a plane of a motor side surface of the collective lens.

According to a second aspect of the invention, there is provided a projection system including a light source apparatus, a display device which forms image light, a light source-side optical system which guides light from the light source apparatus to the display device, a projection-side optical system which projects the image light emitted from the display device onto a screen, and a projection control unit which controls the light source apparatus and the display device, wherein the light source apparatus includes the optical wheel of the invention.

DETAILED DESCRIPTION OF THE INVENTION

First Embodiment

Hereinafter, an embodiment of the invention will be described in detail based on the drawings.

Figure 1:
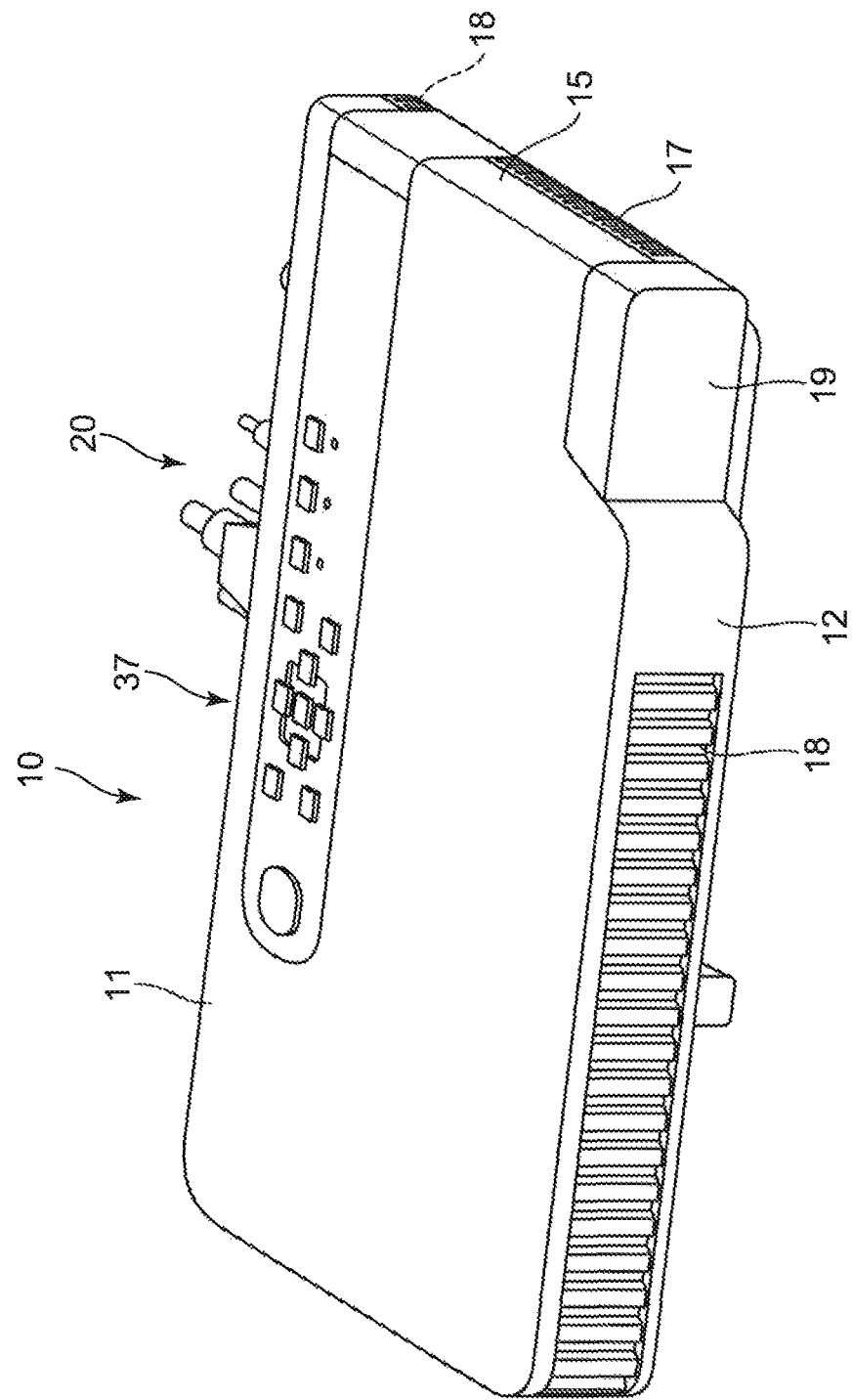
FIG. 1 is an external perspective view showing a projection system according to a first embodiment of the invention.

FIG. 1 is an external perspective view of a projector 10 which is a projection system. In this embodiment, when left and right are referred to in relation to the projector 10, they denote, respectively, left and right in relation to a projecting direction, and when front and rear are referred to in relation to the projector 10, they denote, respectively, front and rear in relation to a direction towards a screen and a traveling direction of a pencil of light emitted from the projector 10 towards the screen.

As is shown in FIG. 1, the projector 10 has a substantially rectangular parallelepiped shape. The projector 10 has a lens cover 19 which covers a projection port which is disposed to a side of a front panel 12 which is referred to as a front side panel of a projector casing. Additionally, a plurality of outside air inlet slits 18 are provided in the front panel 12.

Further, although not shown, the projector 10 includes an IR reception unit which receives a control signal from a remote controller.

In addition, a keys/indicators unit 37 is provided on an upper panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when the light source unit, the display element, a control circuit or the like overheats.

Further, provided in a back side or a back panel of the projector casing are an input/output connector unit where USB terminals, a video signal input D-SUB terminal into which analog RGB video signals are inputted, an S terminal, an RCA terminal, a voice output terminal and the like are provided and (a group of) various types of terminals 20 including a power supply adaptor plug and the like.

Additionally, a plurality of outside air inlet slits are formed in the back panel. A plurality of inside air outlet slits 17 are formed in each of a right panel, not shown, which is a side panel of the projector casing and a left panel 15 which is a side panel shown in FIG. 1. In addition, outside air inlet slits 18 are also formed in a portion of the left panel 15 which lies in a corner portion formed between the back panel and the left panel 15.

Figure 2:
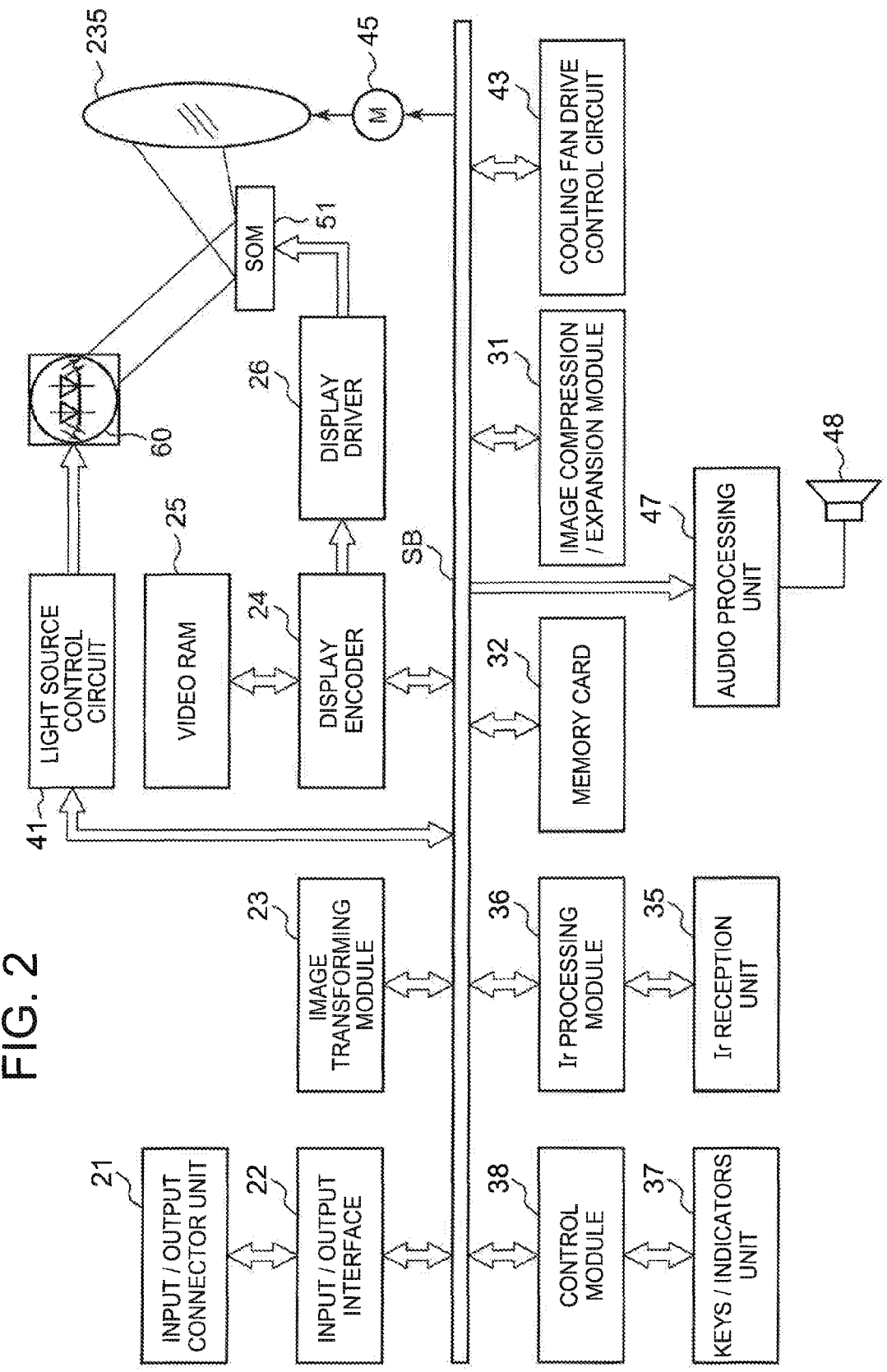
FIG. 2 is a functional block diagram of the projection system according to the first embodiment of the invention.

Next, a projector control unit of the projector 10 will be described by the use of a functional block diagram shown in FIG. 2. The projector control unit includes a control module 38, an input/output interface 22, an image transforming module 23, a display encoder 24, a display driver 26 and the like.

This control module 38 governs the control of respective operations of circuitries within the projector 10 and includes a CPU, a ROM which stores in a fixed fashion operation programs of various types of settings, a RAM which is used as a working memory and the like.

Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module and drives a display device 51, which is a spatial optical modulator (SOM), at an appropriate frame rate in response to the image signal outputted from the display encoder 24. Then, in this projector 10, a pencil of light which is emitted from a light source unit 60 is shone onto a display device 51 via a light source-side optical system, which will be described later, to thereby form an optical image by using reflected light which is reflected by the display element 51. The image so formed is then projected on to a screen, not shown, for display thereon via a projection-side optical system. In addition, a movable lens group 235 of the projection-side optical system is driven by a lens motor 45 for zooming or focusing.

Additionally, an image compression/expansion module 31 performs a recording operation in which a luminance signal and a color difference signal of an image signal are data compressed through ADCT and Huffman coding processes and the compressed data is sequentially written on a memory card 32 which is configured as a detachable recording medium.

Further, when in a reproducing mode, the image compression/expansion module 31 reads out image data recorded on the memory card 32 and expands individual image data which make up a series of dynamic images frame by frame. Then, the image data so expanded is outputted to the display encoder 24 via the image transforming module 23 so that such an operation as enabling the display of dynamic images and the like based on the image data stored on the memory card 32 is performed.

Operation signals generated at the keys/indicators unit 37 which includes the main keys and indicators provided on the upper panel 11 of the projector casing are sent out directly to the control module 38. Key operation signals from the remote controller are received by the IR reception unit 35, and a code signal demodulated at an IR processing module 36 is outputted to the control module 38.

In addition, an audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 to output loudly sound or voice based on the audio data.

In addition, the control module 38 controls a light source control circuit 41 which is configured as a light source control unit. This light source control circuit 41 controls separately the emission of light of red, green and blue wavelength ranges from the light source unit 60 so that light of predetermined ranges of wavelengths which is required when an image is generated is emitted from the light source unit 60.

Further, the control module 38 causes a cooling fan drive control circuit 43 to detect temperatures through a plurality of temperature sensors which are provided in the light source unit 60 and the like so as to control the rotating speed of cooling fans based on the results of the temperature detections. Additionally, the control module 38 also causes the cooling fan drive control circuit 43 to keep the cooling fan rotating even after the power supply to a projector main body is switched off by use of a timer or the like. Alternatively, the control module 38 causes the cooling fan drive control circuit 43 to cut off the power supply to the projector main body depending upon the results of the temperature detections by the temperature sensors.

Figure 3:
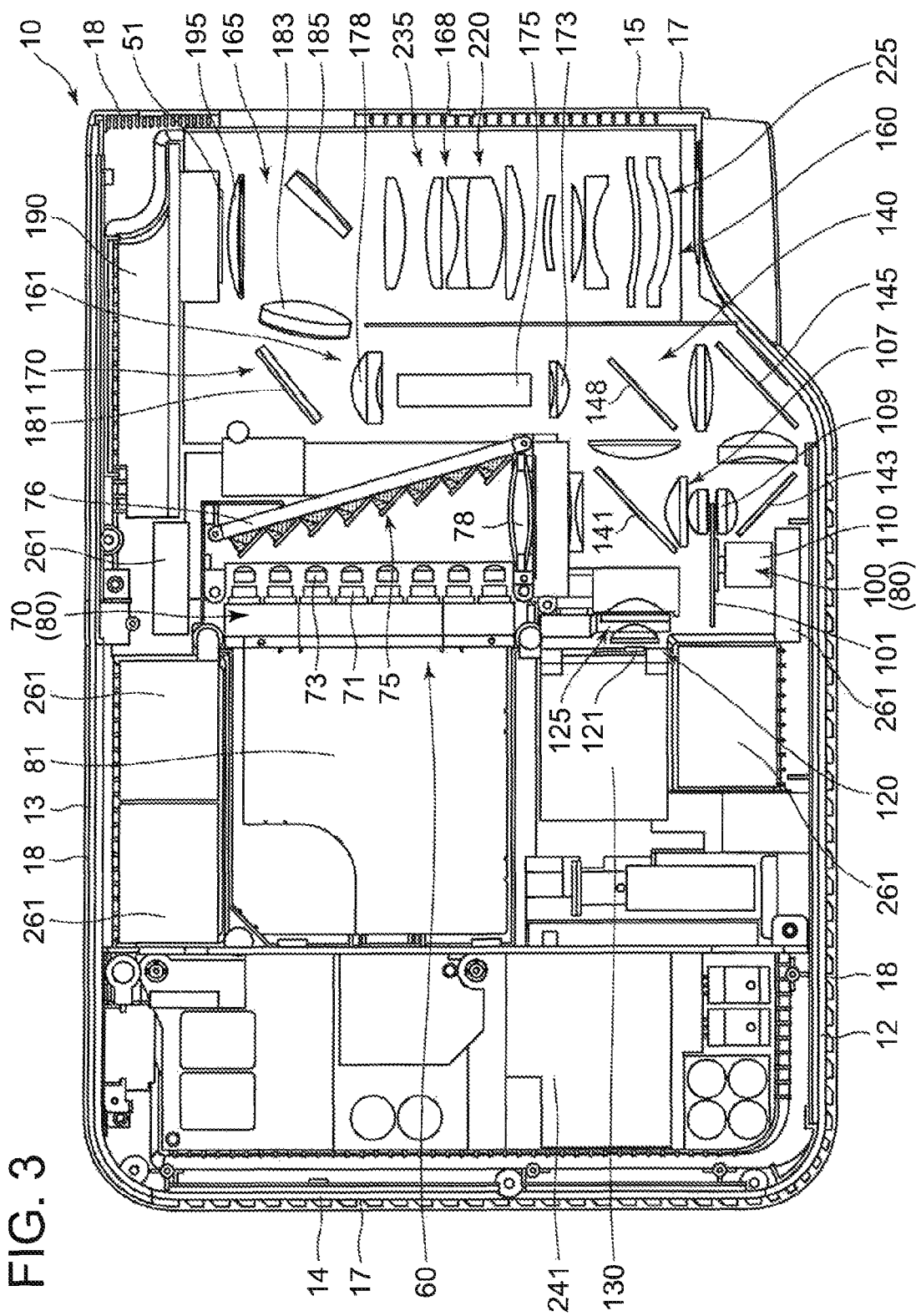
FIG. 3 is a schematic plan view showing an internal construction of the projection system according to the first embodiment of the invention.
Figure 4:
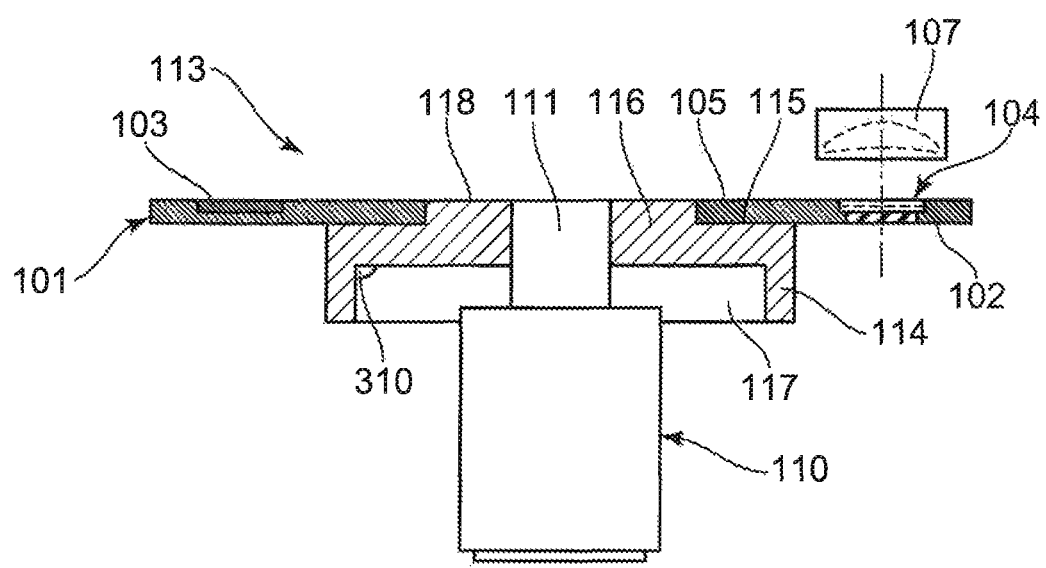
FIG. 4 is a schematic diagram showing an example of an optical wheel device according to the first embodiment of the invention.

Next, an internal construction of the projector 10 will be described. FIG. 3 is a schematic plan view showing an internal construction of the projector 10. FIG. 4 is a partially sectional side view showing briefly a luminescent wheel device 100 which is one of light source devices within the projector 10.

As shown in FIG. 3, the projector 10 includes a control circuit board 241 in the proximity to the right panel 14. This control circuit board 241 includes a power supply circuit block, a light source control block and the like. Additionally, the projector 10 includes the light source unit 60 which is situated to a side of the control circuit board 241, that is, in a substantially central portion of the projector casing.

Further, the projector 10 includes an optical system unit 160 between the light source unit 60 and the left panel 15. This optical system unit 160 is made up of an image generation block 165, a projection-side block 168 and the like.

The light source unit 60 includes:

a blue light source device 70 which is disposed substantially in a laterally central portion of the projector casing and in the proximity to the back panel 13;

an optical wheel device 100 which is disposed on an axis of a pencil of light emitted from the blue light source device 70 and in the proximity to the front panel 12;

a red light source device 120 which is disposed between the blue light source device 70 and the optical wheel device 100; and a light guide optical system 140 which changes axes of light emitted from the optical wheel device 100 and light emitted from the red light source device 120 so as to be coincided in the same axis and collects light of corresponding colors to an incident port of a light tunnel 175 which is a predetermined surface.

The blue light source device 70 includes:

a light source group which is made up of a plurality of blue light sources 71 which are disposed so that their optical axes become parallel to the back panel 13;

a reflection mirror group 75 which changes the directions of axes of light beams emitted from the blue light sources 71 by 90 degrees in the direction of the front panel 12;

a collective lens 78 which collects the light beams emitted from the blue light sources 71 and reflected at the reflection mirror group 75;

a heat sink 81 which is disposed between the blue light sources 71 and the right panel 14; and the like.

In the light source group, the blue light sources 71, which are a plurality of blue laser beam emitting elements, are arranged in a matrix fashion. Additionally, collimator lenses 73 are disposed individually on the optical axes of the blue light sources 71, and the collimator lenses 73 convert the light beams emitted from the blue light sources 71 into parallel light beams in such a manner as to enhance the directivity of each light beam.

In the reflection mirror group 75, a plurality of reflection mirrors are provided integrally on a mirror substrate 76 while being arranged in a step-like fashion and are adjusted in position to emit the light beams emitted from the blue light sources 71 to the collective lens 78 while contracting sectional areas of the light beams in one direction.

A cooling fan 261 is disposed between the head sink 81 and the back panel 13, and the blue light sources 71 are cooled by this cooling fan 261 and the heat sink 81. Further, a cooling fan 261 is also disposed between the reflection mirror group 75 and the back panel 13, and the reflection mirror group 75 and the collective lens 78 are cooled by this cooling fan 261.

The optical wheel device 100 includes:

an optical wheel 101 which is disposed so as to be parallel to the front panel 12, that is, so as to be normal to an axis of light emitted from the blue light source device 70;

a wheel motor 110 which drives to rotate the optical wheel 101;

a collective lens group 107 which collects a pencil of light emitted from the blue light source device 70 to the optical wheel 101 and collects a pencil of light emitted from the optical wheel 101 in the direction of the back panel 13; and a collective lens 109 which collects a pencil of light emitted from the optical wheel 101 in the direction of the front panel 12.

Figure 5:
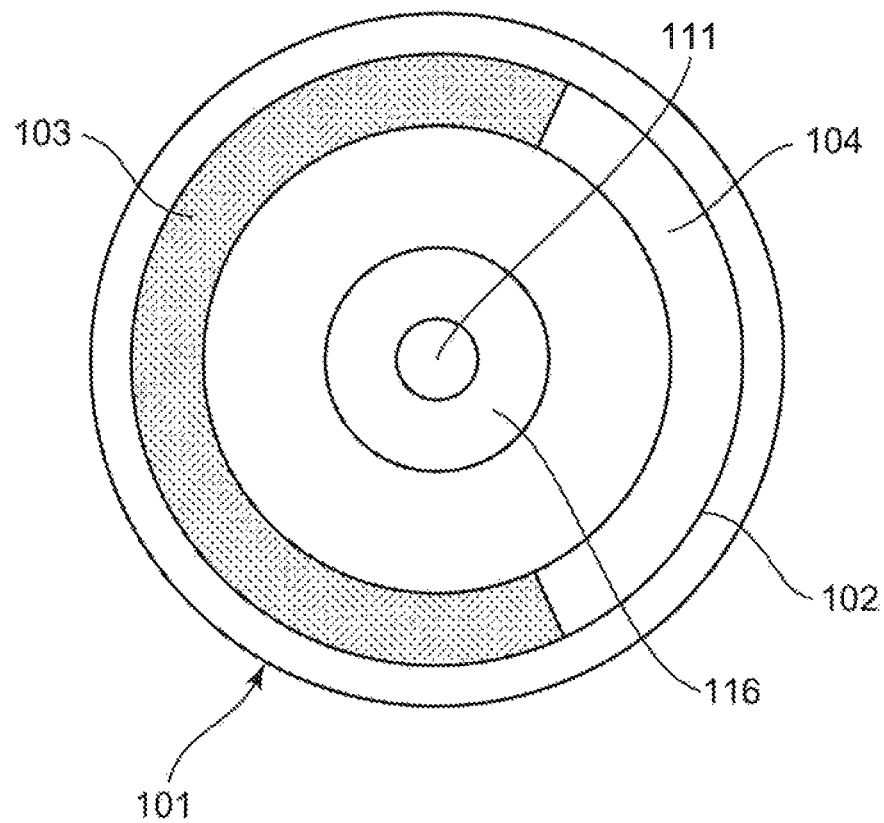
FIG. 5 is a schematic front view showing the example of the optical wheel device according to the first embodiment of the invention.

As shown in FIG. 5, the optical wheel 101 includes:

a luminous light emitting area 103 which receives the light emitted from the blue light source device 70 as excitation light to emit luminous light of a green wavelength range; and a diffuse transmission area 104 which transmits the light from the blue light source device 70 in a diffused fashion, the luminous light emitting area 103 and the diffuse transmission area 104 being provided circumferentially in an end-to-end fashion.

A base material 102 of the optical wheel 101 which is a rotary wheel is a metallic material made of copper, aluminum or the like. An annular groove is formed on a surface of the rotary base material 102 which faces the blue light source device 70. A bottom portion of this groove is mirror finished through silver deposition or the like, and a layer of a green luminescent material is laid out on the mirror finished surface.

Further, in the diffuse transmission area 104, a transparent base material having a light transmission property is fitted in a through hole portion in the rotary base material 102 which is cut therein. Minute irregularities are formed on a surface of the transparent material through sandblasting or the like.

Light of a blue wavelength range emitted from the blue light source device 70 which has been shone onto the luminous light emitting area 103 which is made into the green luminescent material layer, by which the optical wheel 101 is made into a green light source device 80, excites the green luminescent material in the green luminescent material layer.

Pencils of luminous light emitted in every direction from the green luminescent material are sent directly towards the back panel 13 or sent towards the back panel 13 after having been reflected on the surface of the bottom portion of the groove formed on the optical wheel 101 to be incident on the collective lens group 107.

In addition, Light of a blue wavelength range emitted from the blue light source device 70 which has been shone onto the diffuse transmission area 104 of the optical wheel 101 is converted to diffuse transmission light which is diffused by the minute irregularities and is then transmitted through the optical wheel 101 to be incident on the collective lens 109.

A cooling fan 261 is disposed between the wheel motor 110 and the front panel 12, and the optical wheel device 100 and the like are cooled by this cooling fan 261.

The red light source device 120 is a single-color light emitting device and includes a red light source 121 which is disposed so that an optical axis thereof is parallel to those of the blue light sources 71 and a collective lens group 125 which collects light emitted from the red light source 121.

This red light source 121 is a red light emitting diode which emits light of a red wavelength range. The red light source device 120 is disposed so that an optical axis thereof intersects the axis of light emitted from the blue light source device 70 and the axis of light of a green wavelength range which is emitted from the optical wheel 101 at right angles.

Further, the red light source 120 includes a heat sink 130 which is disposed on aside of the red light source 121 which faces the right panel 14. Additionally, a cooling fan 261 is disposed between the heat sink 130 and the front panel 12, and the red light source 121 is cooled by this cooling fan 261.

The light guide optical system 140 includes collective lenses which collect pencils of light of red, green and blue wavelength ranges, reflecting mirrors and dichroic mirrors which change the directions of axes of the pencils of light of the red, green and blue wavelength ranges so that the axes of those pencils of light are coincided in the same axis.

Specifically speaking, a first dichroic mirror 141 is disposed in a position where the light of the blue wavelength range which is emitted from the blue light source device 70 and the light of the green wavelength range which is emitted from the optical wheel 101 intersect the light of the red wavelength range which is emitted from the red light source device 120. The first dichroic mirror 141 transmits the light of the blue wavelength range and the light of the red wavelength range and reflects the light of the green wavelength range in such a way that the direction of the axis of the green light is changed by 90 degrees in the direction of the left panel 15.

Additionally, a first reflecting mirror 143 is disposed on the axis of the light of the blue wavelength range which is transmitted while being diffused through the optical wheel 101, that is, between the collective lens 109 and the front panel 12. The first reflecting mirror 143 reflects the light of the blue wavelength range in such a way that the direction of the axis of the blue light is changed by 90 degrees in the direction of the left panel 15.

Further, a second reflecting mirror 145 is disposed on the axis of the light of the blue wavelength range which is reflected on the first reflecting mirror 143 and in the proximity to the optical system unit 160. The second reflecting mirror 145 changes the axis of the blue light by 90 degrees in the direction of the back panel 13.

A second dichroic mirror 148 is disposed in a position where the axis of the light of the red wavelength range which is transmitted through the first dichroic mirror 141 and the axis of the light of the green wavelength range which is reflected by the first dichroic mirror 141 so as to coincide with the axis of the light of the red wavelength range intersect the axis of the light of the blue wavelength range which is reflected by the second reflecting mirror 145. The second dichroic mirror 148 transmits the light of the blue wavelength range and reflects the light of the red wavelength range and the light of the green wavelength range in such away as to change the directions of the axes of the red light and the green light by 90 degrees in the direction of the back panel 13.

A collective lens is disposed between the dichroic mirrors and between the reflecting mirrors. Further, a collective lens 173 is disposed in the proximity to the light tunnel 175 to collect the light from the light source devices to the incident port of the light tunnel 175.

The optical system unit 160 includes:
the illumination-side block 161 which is situated to the left side of the blue light source device 70;
an image generation block 165 which is situated in the proximity to a position where the back panel 13 intersects the left panel 15; and
the projection-side block 168 which is situated between the light guide optical system 140 and the left panel 15, those three blocks being formed substantially into a U-shape.

The illumination-side block 161 includes a part of a light source-side optical system 170 which guides the light source light emitted from the light source unit 60 to the display device 51 of the image generation block 165.

The illumination-side block 161 includes, as the part of the light source-side optical system 170:
the light tunnel 175 which converts the pencil of light emitted from the light source unit 60 into a pencil of light whose intensity is uniformly distributed;
a collective lens 178 which collects light emitted from the light tunnel 175;
a light axis changing mirror 181 which changes the direction of the axis of a pencil of light emitted from the light tunnel 175 in the direction of the image generation block 165; and the like.

The image generation block 165 includes, as the light source-side optical system 170:
a collective lens 183 which collects the light source light which is reflected by the light axis changing mirror 181 to the display device 51; and
a light shining mirror 185 which shines a pencil of light which is transmitted through the collective lens 183 on to the display device 51 at a predetermined angle.

Further, the image generation block 165 includes a DMD which is the display device 51. A heat sink 190 is disposed between the display device 51 and the back panel 13 to cool the display device 51, whereby the display device 51 is cooled by this heat sink 190. Additionally, a condenser lens 195, which is apart of the projection-side optical system 220, is disposed in the proximity to the front of the display device 51.

The projection-side block 168 includes a lens group of the projection-side optical system 220 which projects "on" light which is reflected by the display device 51 onto a screen. The projection-side optical system 220 has a fixed lens group 225 which is incorporated in a fixed lens barrel and a movable lens group 235 which is incorporated in a movable lens barrel. These are made into a variable-focus lens with a zooming function, and zooming and focusing can be executed by moving the movable lens group 235 by a lens motor.

By configuring the projector 10 in the way described heretofore, when the optical wheel 101 is rotated and light is emitted at different timings from the blue light source device 70 and the red light source device 120, light of the red wavelength range, light of the green wavelength range and light of the blue wavelength range are incident sequentially on the light tunnel 175 by way of the light guide optical system 140 and are then incident on the display device 51 by way of the light source-side optical system 170. Consequently, the display device 51 of the projector 10, which is the DMD, displays red, green and blue images in a time-sharing fashion according to data, whereby a full-color image can be generated on the screen.

The optical wheel 100 of the projector 10, which is the projection system, uses a wheel holding member 113 shown in FIG. 4. This wheel holding member 113 is fixed to a distal end of a motor shaft 111, and the optical wheel 101 on which the luminous light emitting area 103 and the diffuse transmission area 104 are disposed end to end in the circumferential direction is attached to the motor shaft 111 by the wheel holding member 113.

In describing constituent portions of the optical wheel device 100, a direction which is directed towards the blue light source device 70 is referred to as a forward direction, a side of the optical wheel device 100 which faces towards the blue light source device 70 is referred to as a front surface or side, and a side thereof which faces in the direction of the front panel 12 of the projector 10, that is, a side thereof which faces towards the wheel motor 110 is referred to as a rear surface or side.

This wheel holding member 113 has a circular main body portion 114 which includes a front surface and a rear surface which are planes normal to an axis of the motor shaft 111. The front surface of the planes constituting both surfaces of the main body portion 114 is configured as a wheel support surface 115, and the optical wheel 101 is fixed thereto with an adhesive.

A support ring portion 116 is provided on a rotational center side of the wheel support surface 115. The support ring portion 116 has the same thickness as that of the optical wheel 101 and projects from a rotational center portion of the main body portion 114 to the front side. This support ring portion 116 has an outside diameter which coincides with an inside diameter of the optical wheel 101 and an inside diameter which coincides with an outside diameter of the motor shaft 111, whereby the support ring portion 116 enables the wheel holding member 113 to be fixed to the distal end of the motor shaft 111.

The main body portion 114, whose front surface is made into the wheel support surface 115, has an outside diameter which is smaller than an inside diameter which is defined by the luminous light emitting area 103 and the diffuse transmission area 104. Consequently, the main body portion 114 holds fixedly the optical wheel 101 in an ensured fashion by fixing the optical wheel 101 to the wheel support surface 115 with a heat conductive adhesive without interrupting the emission of the light of the blue wavelength range which is transmitted through the diffuse transmission area 104 from the optical wheel device 100.

The support ring portion 116, whose outside diameter coincides with the inside diameter of the optical wheel 101, positions a central position of the optical wheel in a central position of the wheel holding member 113, that is, at the center of the motor shaft 111 which constitutes a rotational center of a rotary portion of the optical wheel device in an ensured fashion. Thus, the support ring portion 116 holds the optical wheel 101 so that a rotational center of the optical wheel 101 does not deflect.

In addition, a projecting amount of the support ring portion 116 from the wheel support surface 115 towards the collective lens group 107, which is the thickness of the support ring portion 116, is equal to the thickness of the optical wheel 101. Because of this, a front end face 118 of the support ring portion 116 which faces the collective lens group 107 is same level with a front plane 105 of the optical wheel 101 which constitutes an incident side of the optical wheel 101 on which the light of the blue wavelength range is incident. Then, the wheel holding member 113 is fixed to the distal end of the motor shaft 111 in such a way that the front plane 105 is same level with a distal end face of the motor shaft 111.

Consequently, in the optical wheel device 100, the collective lens group 107 can be disposed in close proximity to the front surface of the optical wheel 101. When the light of the blue wavelength range is incident on the optical wheel device 100 to be shone onto the luminous light emitting area 103 and the diffuse transmission area 104, the collective lens group 107 collects the light of the blue wavelength range and also collects luminous light which is emitted from the luminous light emitting area 103.

By disposing the collective lens group 107 in such a way, the light of the blue wavelength range, which is incident light, can be collected to the luminous light emitting area 103 and the diffuse transmission area 104 effectively. Additionally, luminous light which is emitted in every direction from the luminous light emitting area 103 is allowed to be incident on the collective lens group 107 without any loss so as to be collected to the collective lens group 107 effectively.

A surface of this wheel holding member 113 which faces the wheel motor 110, which is a rear side of the main body portion 114 thereof, is also made into a rotary plane which is normal to the rotating axis of the motor shaft 111. Then, a cylindrical recess portion 117 having a central axis which coincides with a rotating axis of the main body portion 114 is formed on a rear surface side of the wheel holding member 113. An adhesive of acryl system or epoxy system is accommodated so as to adhere to the recess portion 117 as a balance material 310.

As to the adhesive, an appropriately small amount of adhesive is dropped or poured to a circumferential edge portion of a bottom surface of the cylindrical recess portion 117 to be solidified thereat. The provision of the adhesive in such a way can correct a production error of the optical wheel 101 or the wheel holding member 113, as well as a rotational balance error of the optical wheel 101 which is caused by disposing separately in the circumferential direction on the optical wheel 101, the luminous light emitting area 103 which is made up of the luminescent material applied layer and the diffuse transmission area 104 in which the transparent base material having the light transmissivity is fitted in the through hole portion cut in the base material 102 of the rotary plate.

In this way, the wheel holding member 113 has the recess portion 117 on the rear surface side which is the surface of the main body portion 114 thereof. Because of this, by disposing the small amount of balance material 310 such as the adhesive in the recess portion 117, the weight balance of the rotary portion of the optical wheel device 100 can be controlled by the amount of the balance material 310, thereby making it possible to control easily the rotating balance of the rotary portion.

Additionally, the adhesive which is the balance material 310 is placed at a corner of a side wall portion of the recess portion 117 as shown in FIG. 4, whereby even though the optical wheel 101 is rotated, the fall and scatter in a radiation direction (radial outside direction) of the adhesive which is caused by a centrifugal force produced by the rotation of the optical wheel 101 can be prevented by an outer circumferential wall of the recess portion 117.

The shape of the recess portion 117 is not limited to the cylindrical shape which is centered at the rotational center of the wheel holding member 113. Hence, a circular groove centered at the rotational center of the wheel holding member 113 and having a predetermined width may be formed into an annular shape on the rear surface of the main body portion 114. Although not shown, the recess portion 117 may be provided on each side of the wheel holding member 113.

In this way, since a distal end face on the motor shaft 111 side of the optical wheel device 100 is not caused to project from the front surface of the optical wheel 101, it is possible to enhance the degree of design freedom in disposing a lens unit including the collective lens group 107 which collects efficiently the excitation light and the like to the optical wheel 101.

Second Embodiment

In the first embodiment, the optical wheel 101 of the optical wheel device 100 is described as having the luminescent light emitting area 103 and the diffuse transmission area 104 which are disposed into the annular shape. However, there may be provided an optical wheel 101 which has only a luminous light emitting area 103 which is formed into an annular shape.

Figure 6:
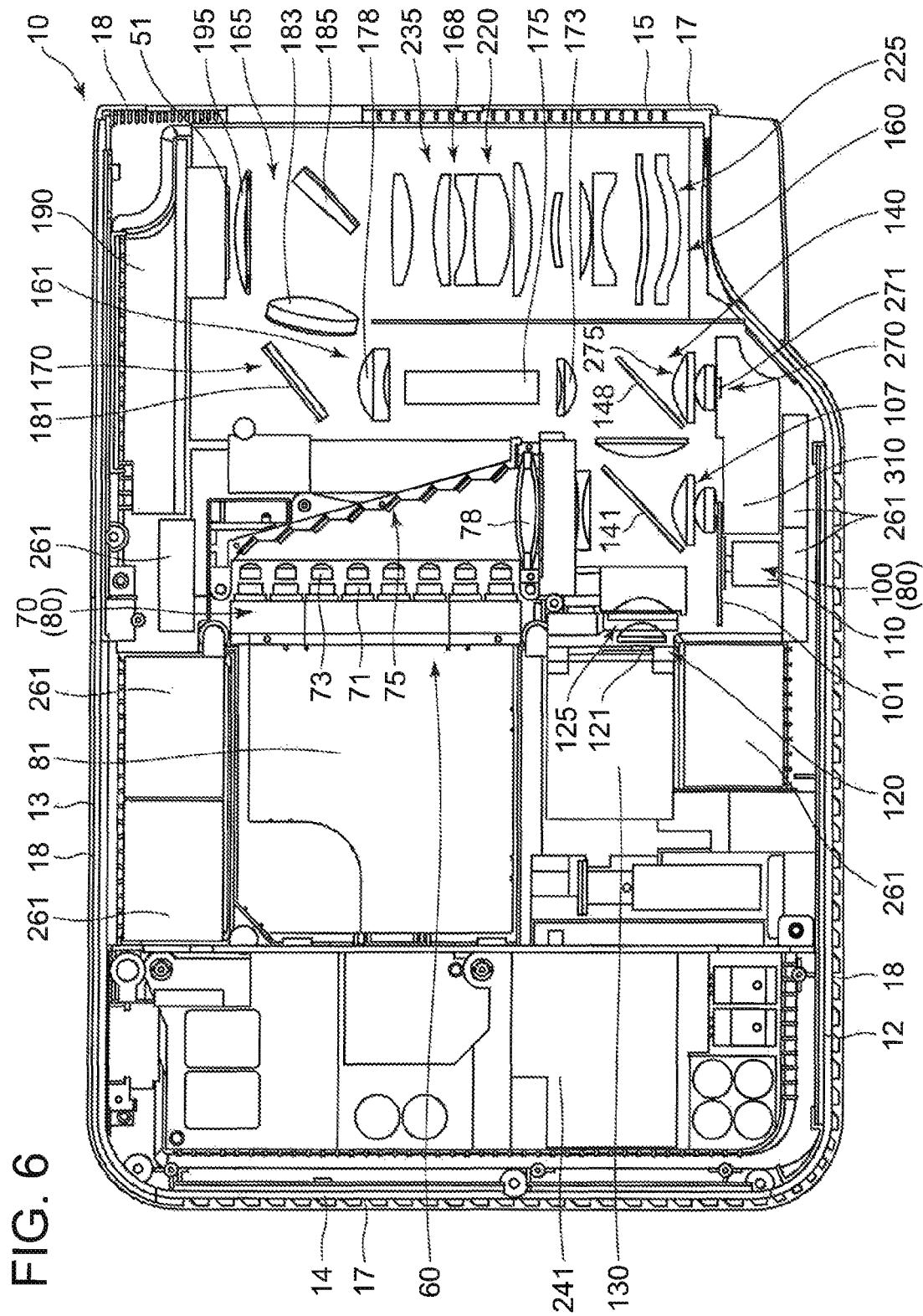
FIG. 6 is a schematic plan view showing an internal construction of a projection system which uses an optical wheel device according to a second embodiment of the invention.

As this occurs, a projector 10 which is a projection system which uses this optical wheel device 100 will be configured as shown in FIG. 6.

Namely, in an optical wheel device 100 according to a second embodiment, in place of the optical wheel device 100 shown in FIG. 4, the optical wheel device 100 is disposed which includes an optical wheel 101 which has no diffuse transmission area 104. Additionally, the optical elements which are disposed along the path of the light of the blue wavelength range which is transmitted through the optical wheel 101 are removed. The optical elements above include the first reflecting mirror 143 which is disposed on the side of the optical wheel 101 which faces the front panel 12, the second reflecting mirror 145 which reflects the reflected light from the first reflecting mirror 143 towards the second dichroic mirror 148 and the light tunnel 175, and the like. Instead of those optical elements so removed, a second blue light source device 270 is provided which emits light of a blue wavelength range.

This second blue light source device 270 uses a blue light emitting diode as a blue light source 271 and has a collective lens group 275. Light of a blue wavelength range which is transmitted through the collective lens group 275 is combined with light of a green wavelength range which is emitted from the optical wheel device 100 which is a green light source device 80 and light of a red wavelength range which is emitted from a red light source device 120 by way of a second dichroic mirror 148, whereby the blue, green and red light beams are incident on a light tunnel 175 with their axes made to coincide with one another.

Figure 7:
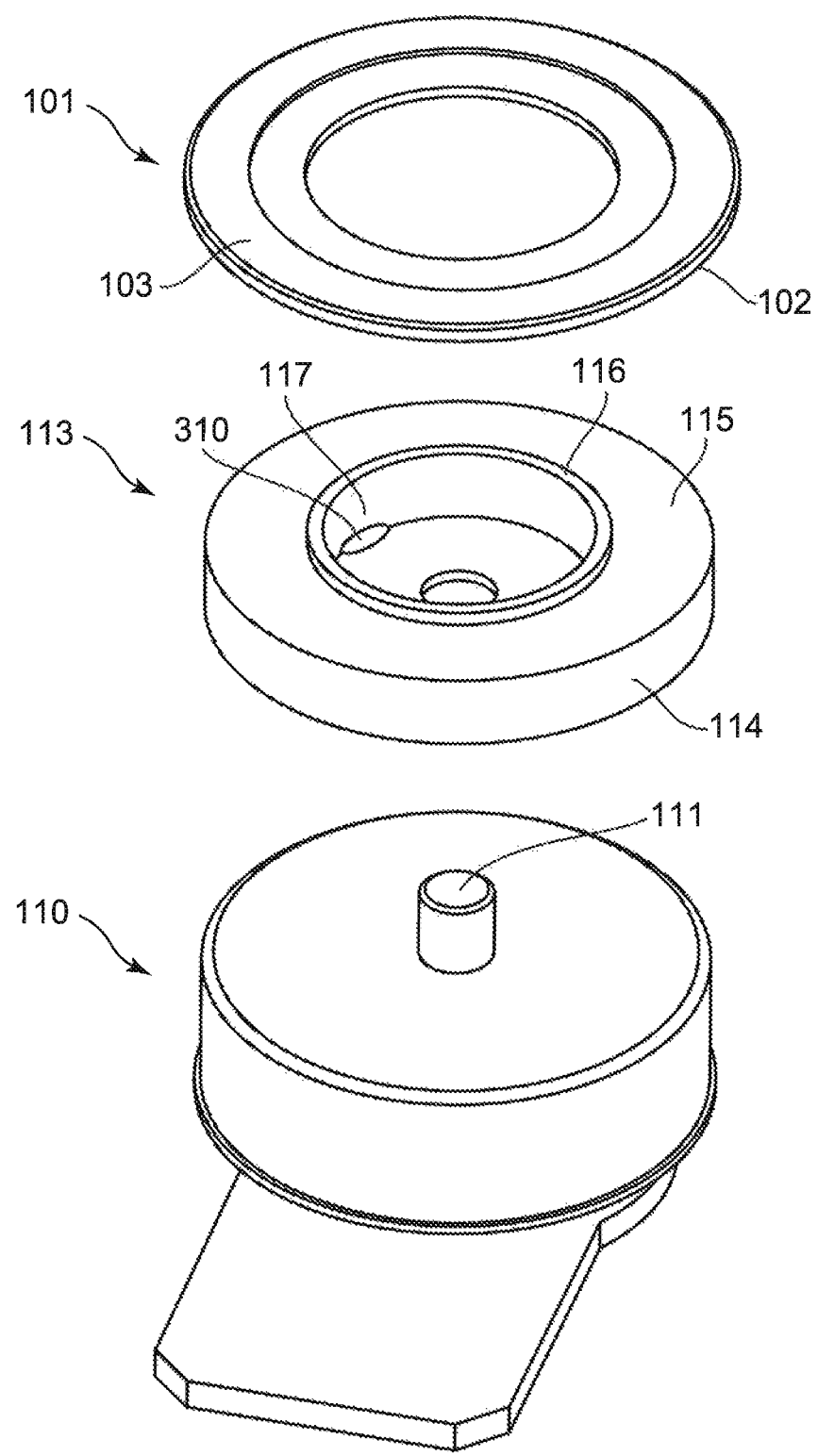
FIG. 7 is an exploded perspective view of a main part of the optical wheel device according to the second embodiment of the invention.
Figure 8:
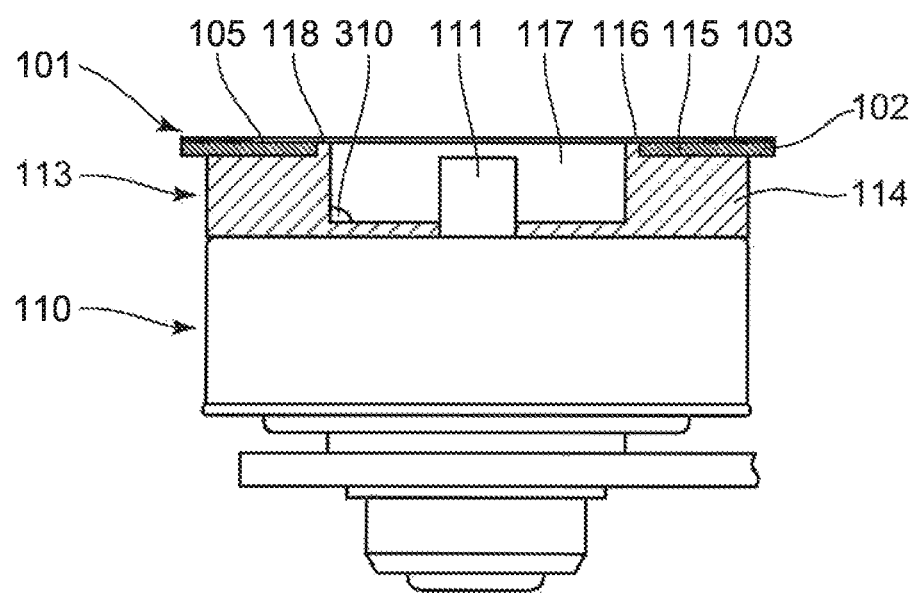
FIG. 8 is a schematic diagram showing the main part of the optical wheel device according to the second embodiment of the invention.

In the optical wheel device 100 which is the green light source device 80, too, as shown in FIGS. 7 and 8, the optical wheel 101 is fixed to a motor shaft 111 of a wheel motor 110 (by way of a wheel holding member 110) by using the wheel holding member 113 with respect to the wheel motor 110.

It is noted that this optical wheel device 100 does not have the collective lens 109 provided on the rear surface side of the optical wheel 101 shown in FIG. 4 since no pencil of light exists which passes through the optical wheel 101. Thus, the optical wheel device 100 includes only a collective lens group 107 which is disposed on a front surface side of the optical wheel 101.

As shown in FIGS. 7 and 8, this optical wheel 101 is a flat plate which is formed into a circular ring shape. The optical wheel 101 has a luminous light emitting area 103 to which a luminescent material is applied annularly along a circular outer circumference on one surface thereof. An outside diameter of the optical wheel 101 is substantially equal to or slightly larger than an outside diameter of the wheel holding member 113.

The wheel holding member 113 has a front surface and a rear surface which are normal to a rotational axis thereof and is formed into a circular shape whose outside diameter is substantially the same as an outside diameter of the wheel motor 110. The wheel holding member 113 has a hole in a center thereof in which the motor shaft 111 is fixed in place. The wheel holding member 113 also has a recess portion 117 on a front surface side thereof which is opposite to a side thereof which faces the wheel motor 110, and the recess portion 117 is opened to the front surface side.

The recess portion 117 is formed into a cylindrical shape which is centered at the rotational axis of the wheel holding member 113. An annular support ring portion 116 projects along a circumference of the recess portion 117 to a high amount, which is substantially the same as a thickness amount of the optical wheel 101, from a wheel support surface 115, which is a front surface of a main body portion 114 of the wheel holding member 113. Additionally, the support ring portion 116 has an outside diameter which is equal to an inside diameter of the optical wheel 101.

Consequently, as shown in FIG. 8, a front end face 118 of the support ring portion 116 which lies on a side facing the collective lens group 107, not shown, (refer to FIG. 4) can be made same level with the optical wheel 101 which is fixed to the wheel support surface 115, which is the front surface of the main body portion 114 of the wheel holding member 113, with a heat conductive adhesive, that is, can be made same level with a front surface side plane 105 of a rotary plate base material 102 of the optical wheel 101. Thus, the support ring portion 116 can be prevented from projecting further forwards than a front surface of a green luminescent material layer which is applied to a mirror finished front surface of the rotary plate base material 102.

Because of this, in the optical wheel device 100 which is the green light source device 80, a front surface of the optical wheel 101 constitutes a plane which is same level with a frontmost end face of the wheel holding member 113 and a distal end of the motor shaft 111 or a plane which slightly projects from the frontmost end face of the wheel holding member 113 and the distal end of the motor shaft 111.

By adopting this configuration, the surface of the optical wheel 101 to which the luminescent material layer is applied constitutes a plane which lies farthest from the wheel motor 110, whereby the collective lens group 107 can be disposed in close proximity to the optical wheel 101, the collective lens group 107 being configured to collect light incident on the luminescent material layer which is the luminous light emitting area 103 and luminous light emitted from the luminescent material layer.

An adhesive can be disposed, as a balance material 310, on a circumferential edge of a bottom portion of the recess portion 117 which is recessed into the cylindrical shape from the surface of the wheel holding member 113, and this configuration is similar to the configuration of the optical wheel device 100 of the first embodiment. Thus, the weight balance of the rotating wheel holding member 113 can be controlled and adjusted easily and accurately.

The shape of the recess portion 117 is not limited to the cylindrical shape which is centered at the rotational axis of the wheel holding member 113. Hence, the recess portion 117 may be formed as a circular cylindrical groove centered at the rotational center of the wheel holding member 113 and having a predetermined width on an inner side of the support ring portion 116.

In the embodiment shown in FIGS. 7 and 8, an outer rotor-type motor is used as the wheel motor 110. This outer rotor-type motor is such that the motor shaft 111 and a casing of a main body of the wheel motor 110 rotate together, and therefore, the wheel holding member 113 is fixed to the motor shaft 111 by bonding a rear surface of the main body portion 114 of the wheel holding member 113 to a front surface of the main body of the wheel motor 110.

Further, the wheel holding member 113 is formed into a flat circular shape, and an outside diameter thereof is substantially equal to an outside diameter of the wheel motor 110. Additionally, the wheel holding member 113 has front and rear surfaces which are normal to the rotational axis thereof. An outside diameter of the optical wheel 101 is substantially equal to the outside diameter of the wheel holding member 113.

Because of this, the whole of the optical wheel device 100 is made so small as the outside diameter of the wheel motor 110, and hence, it is possible to provide the optical wheel device 100 which is small in size and in which the collective lens group 107 is disposed in close proximity to the front of the optical wheel 101.

Consequently, the projector 10 itself can easily be made small in size as a result of using the small optical wheel device 100 which is the green light source device 80 and the second blue light source device 270 which uses the blue light emitting diode which can be made small in size extremely easily.

Third Embodiment

Figure 9:
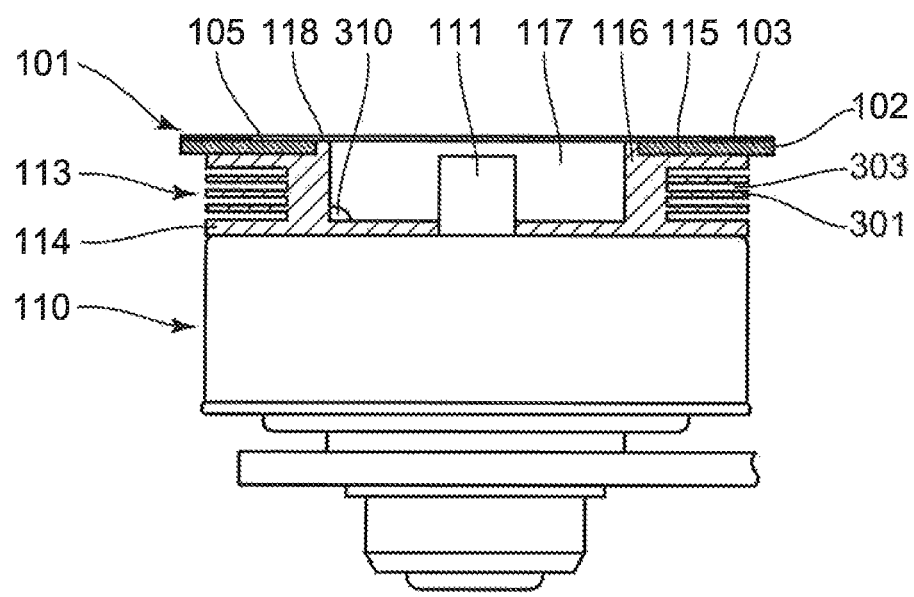
FIG. 9 is a schematic diagram of a main part of an optical wheel device according to a third embodiment of the invention.

Further, in an optical wheel device 100 according to a third embodiment, as shown in FIG. 9, a configuration may be adopted in which slits 303 are provided in a main body portion 114 of a wheel holding member 113 by cutting the slits 303 in the main body portion 114 from an outer circumferential surface of the main body portion 114 towards a center thereof so as to be parallel to a front surface and rear surface of the main body portion 114, whereby a large number of thin plate-shaped fins 301 are formed.

In this way, by increasing the surface area of the wheel holding member 113 by providing the slits 303 in the outer circumference of the main body portion 114, it is possible not only to reduce the weight of the optical wheel device 100 but also to enhance a heat dissipating efficiency of the optical wheel 101.

Figure 10A:
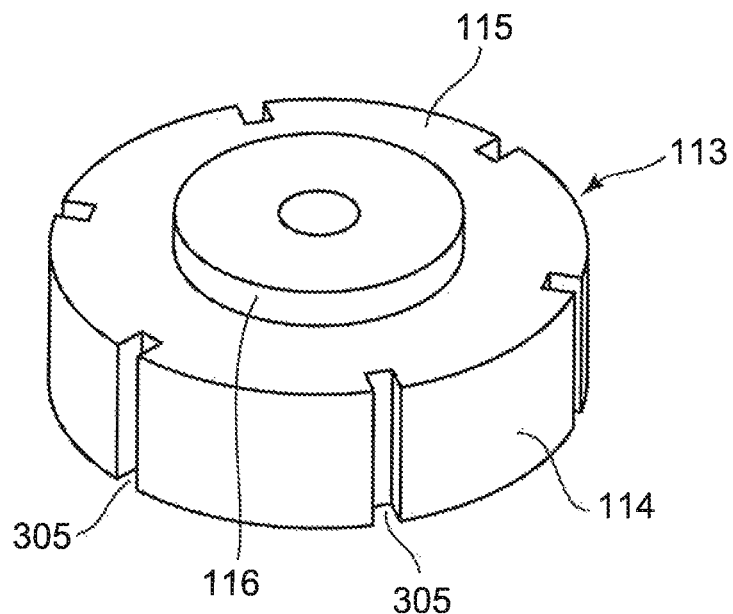
FIG. 10A is a perspective view showing a modified example of a wheel holding member which is used in the optical wheel device according to the first embodiment of the invention.
Figure 10B:
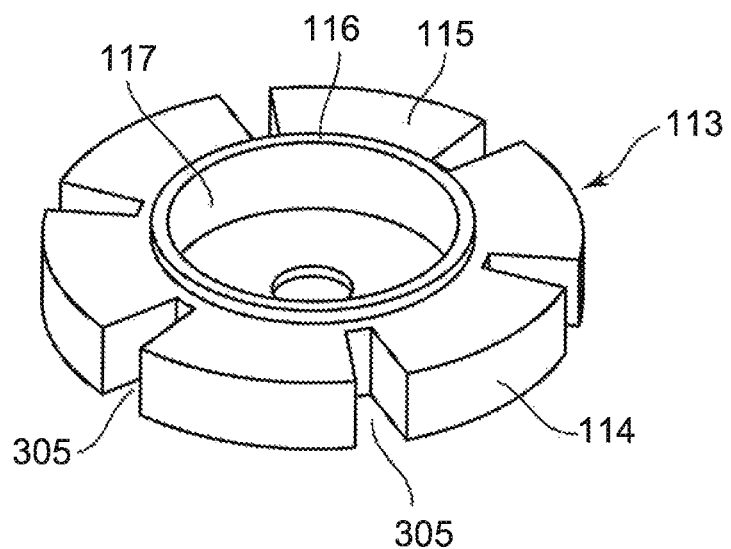
FIG. 10B is a perspective view showing a modified example of a wheel holding member which is used in the optical wheel device according to the second embodiment of the invention.

Additionally, as shown in FIGS. 10A, 10B, cutout groove portions 305 may be formed in an outer circumference of a main body portion 114 of a wheel holding member 113 so as to extend therethrough from a front surface to a rear surface of the main body portion 114.

Figure 11:
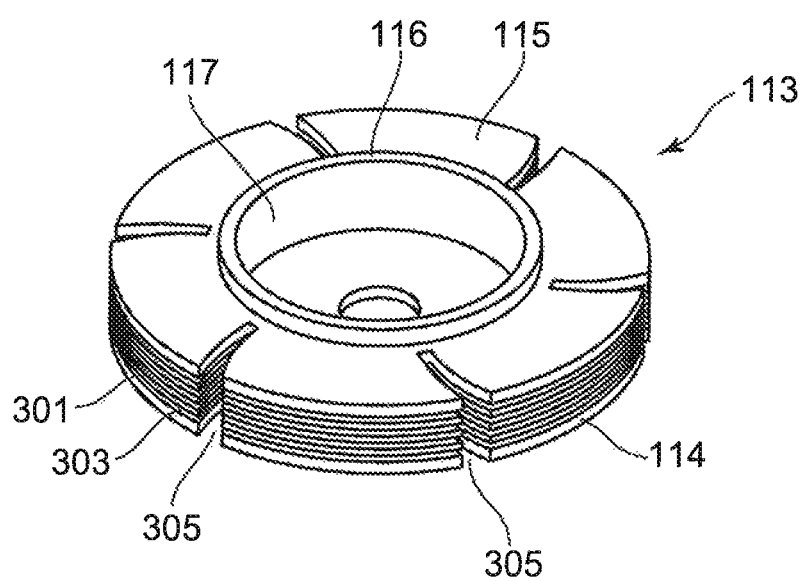
FIG. 11 is a perspective view showing another modified example of a wheel holding member which is used in the optical wheel device according to the second embodiment or the third embodiment of the invention.

In addition, as shown in FIG. 11, both slits 303 and cutout groove portions 305 may be provided in a main body portion 114 so as to form a large number of thin plate-shaped fins 301 therein to thereby enhance further the heat dissipating efficiency of a wheel holding member 113.

In the cutout groove portions 305 shown in FIG. 11, the cutout groove portions 305 which extend from an outer circumferential surface of the main body portion 114 towards a rotational axis of a wheel holding member 113 are formed into a spiral shape, so that air around the cutout groove portions 305 is caused to move in the direction of an outer circumference or a rotational center of the main body portion 114 as the wheel holding member 113 rotates.

In this way, the spiral shape of the cutout groove portions 305 enables the air therearound to flow as the main body portion 114 rotates, thereby the heat dissipating efficiency of the wheel holding member 113 being enhanced much further.

In the event that the rotary plate base material 102 of the optical wheel 101 has no light transmissivity and luminous light is emitted only to the excitation light incident side of the optical wheel 101, the construction of the optical wheel device 100 is not limited to the aforesaid construction in which the support ring portion 116 has the outside diameter which is equal to the inside diameter of the optical wheel 101.

As this occurs, a configuration may be adopted in which the outside diameter of an optical wheel 101 is made smaller than the outside diameter of a wheel holding member 113 and a wheel support ring portion 116 whose inside diameter is equal to the outside diameter of the optical wheel 101 is caused to project to the front along an outer circumference of a wheel support surface 115, so that the annular optical wheel 101 is fixedly inserted into an annular shape which is defined an inside of the wheel support ring portion 116.

Further, a first support ring portion 116 whose outside diameter coincides with an inside diameter of an optical wheel 101 and a second support ring portion whose inside diameter coincides with an outside diameter of the optical wheel 101 are formed concentrically, so that the optical wheel 101 may be inserted (in a recess portion) between the first support ring portion which lies inside (an inside diameter portion) and the second support ring portion which lies outside (an outside diameter portion).

Fourth Embodiment

In the embodiments that have been described heretofore, the distal end face of the support ring portion 116 which corresponds to the projecting portion is described as being same level with the surface of the optical wheel 101 which lies on the side facing the collective lens group 107 or being positioned closer to the motor 110 than the surface of the optical wheel 101 which lies on the side facing the collective lens group 107.

Figure 12:
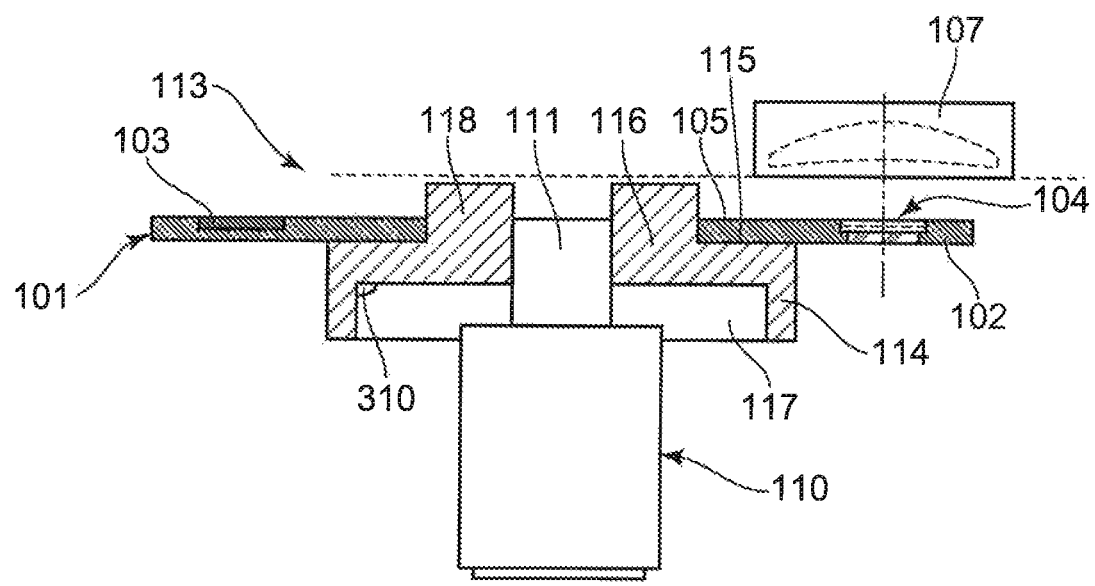
FIG. 12 is a perspective view showing another modified example of a wheel holding member which is used in the optical wheel device according to the first embodiment of the invention.

However, as shown in FIG. 12, even though a distal end face of a support ring portion 116 which corresponds to a projecting portion projects slightly further towards aside of collective lens group 107 than a surface of an optical wheel 101 which lies on a side facing the collective lens group 107, in the event that the distal end face of the support ring portion 116 is positioned closer to a wheel motor 110 than a plane which contains a surface of the collective lens group 107 which lies on a side facing the optical wheel 101, the distal end face of the support ring portion 116 does not interfere with the collective lens group 107, even though the support ring portion 116 has a large diameter (or the collective lens group 107 has a large diameter).

Even with this configuration, a distance between the collective lens group 107 and the optical wheel 101 can be shortened, thereby making it possible to make the resulting optical wheel device small in size and light in weight.

FIG. 12 shows a modified example of the first embodiment. However, even with the wheel holding member 113 of the second embodiment shown in FIG. 7 or the like which has the recess portion 117 which is opened to the front surface side of the wheel holding member 113 which is opposite to the side facing the wheel motor, the distal end face of the support ring portion 116 may be caused to project slightly further towards a side of the collective lens group 107 than the surface of the optical wheel 101 which lies the side facing the collective lens group 107.

In addition, the recess portion 117 may be provided on both of the motor side surface and the opposite surface thereto of the wheel holding member 113.

Although the optical wheel device 100 is described as the green luminescent material being used in the luminous light emitting area 103 so that the optical wheel device 100 constitutes the green light source device 80, the optical wheel device 100 can also constitute a light source device which emits light of the green wavelength range and light of the red wavelength range by forming a luminous light emitting area 103 on which a green luminescent material layer where a green luminescent material is used and a red luminescent material layer where a red luminescent material is used are disposed annularly.

As this occurs, there can be provided a projector 10 from which the red light source device 120 which uses the red light emitting diode is removed.

In addition, as the optical wheel 101, there can also be provided an optical wheel 101 to which a luminescent material which emits light of a wavelength range of a complementary color is applied, in addition to the optical wheel 101 to which the red luminescent material and the green luminescent material are applied together.

As an optical wheel 101 to which a luminescent material is applied, there may be provided a rotary wheel in which a base material having light transmissivity is used for a rotary plate base material 102 and which has an outside diameter larger than an outside diameter of a wheel holding member 113. Then, a dichroic mirror layer which transmits ultraviolet light and reflects visible light is formed on an incident side surface of the rotary plate base material 102, while on a surface of an opposite side (a surface of an emerging side) to the incident side of the rotary plate base material 102, a luminescent material which emits light of a wavelength range of visible light is applied as required.

In an optical wheel device 100 which uses the optical wheel 101 above, the optical wheel 101 with the opposite side on which the luminescent material is applied is fixed to a motor shaft 111 by means of a wheel holding member 113. Then, the ultraviolet light is shone onto this optical wheel 101 from the side of the wheel motor 110 and the luminescent material applied on the opposite side is excited by the ultraviolet light which is transmitted through the dichroic mirror layer and then the rotary plate base material 102, as a result of that, the luminous light of a wavelength range of visible light is emitted from the opposite side to the side of the wheel motor 110.

Even with this configuration, the luminous light can be collected with good efficiency by a collective lens group which is disposed in close proximity to the optical wheel 101.

Further, the optical wheel 101 is not limited to the luminescent wheel to which the luminescent material or materials are applied and hence may be a color wheel which transmits white light of a high-intensity discharge lamp to produce red light, green light and blue light. And the collecting efficiency can be improved.

With this optical wheel 101 used as such a color wheel, when a collective lens is disposed which collects colored light from the color wheel, the collective lens is easily designed to be disposed on a side of the optical wheel 101 which is opposite to a side facing a wheel motor 110.

Additionally, also when the optical wheel device 100 is used as an optical disc device which is an optical storage medium, the rotational balance of an optical disc which is the optical wheel 101 can easily be controlled, and an incident lens which is the collective lens can be disposed in close proximity to the optical disc. Thus, the miniaturization of the optical disc device can be facilitated. In addition, incident light on the optical disc can be collected to a predetermined location of the optical disc, and reflected light can be collected efficiently.

Thus, according to the embodiments, it is possible to provide the optical wheel device which is small in size and light in weight and which can reduce the parts cost and the fabrication costs of the rotary wheel which is the optical wheel while suppressing the generation of vibrations by controlling the weight balance of the optical wheel 101 by disposing the balance material 310 in the recess portion 117, and the projector 10 which is the projection system which uses the optical wheel device above.

Further, according to the embodiments, in the optical wheel device 100 including the rotary wheel, since the wheel holding member 113 described above is attached to the motor shaft 111 of the wheel motor 110, the degree of design freedom is enhanced in disposing the collective lens made up of the collective lens group 107 and the like which collects light to the excitation light source side of the wheel efficiently.

In addition, in the event that the optical wheel 101 is fixed to the wheel holding member 113 by forming the support ring portion 116 thereon, the optical wheel 101 can be fixedly held in an ensured fashion with the central position of the optical wheel 101 aligned with the rotational center easily. Consequently, it is possible to provide the optical wheel device 100 which is small in size and efficient in light collection. Additionally, the assemblage of the wheel holding member 113 and hence the fabrication and design of the projector 10 as the projection system can be facilitated.

When the recess portion 117 is provided on the front surface or the collective lens side of the wheel holding member 113, the control of the weight balance can easily be performed by dropping the balance material 310 into the recess portion 117. When the recess portion 117 is provided on the rear surface of the wheel holding member 113, the inside diameter of the optical wheel 101 can be reduced to increase the effective area of the front surface of the optical wheel 101 without increasing the size of the optical wheel 101.

In the event that the balance material 310 is placed in the recess portion 117, not only can the rotational balance of the optical wheel device be controlled appropriately, but also the fall of the balance material 310 can easily be prevented which would result from the rotation of the optical wheel device. Additionally, it is easy to form the cylindrical recess portion 117 whose rotational center coincides with its center.

When the slits 303 and the cutout groove portions 305 are formed in the outer circumference of the wheel holding member 113, the heat dissipating efficiencies of the wheel holding member 113 and the optical wheel 101 can be enhanced. In addition, by forming the cutout groove portions 305 into the spiral shape, the heat dissipating efficiency can be enhanced further. Further, when the optical wheel 101 is fixed to the wheel holding member 113 with the heat conductive adhesive, the cooling of the optical wheel 101 can be performed with good efficiency.

While the several embodiments of the invention have been described heretofore, these embodiments are presented as the examples, and hence, there is no intention that the scope of the invention is limited by the embodiments. These novel embodiments can be carried out in other various forms, and various omissions, replacements, alterations and modifications can be made thereto without departing from the spirit and scope of the invention. The resulting embodiments and modifications thereof are incorporated in the spirit and scope of the invention and are also incorporated in the scope of inventions claimed herein and their equivalents.

What is claimed is:

1. An optical wheel device comprising:
a motor;
a motor shaft extending from the motor, wherein the motor shaft extends along an axis in a first direction and a second direction opposite to the first direction;
a wheel holding member attached to the motor shaft to be rotated by the motor about the axis,
wherein the wheel holding member comprises:
a first surface facing the first direction;
a second surface facing the second direction; and
a projecting portion projecting past the first surface along the axis of the motor shaft in the first direction,
wherein the wheel holding member defines a recess which is centered at the motor shaft;
an optical wheel attached to the first surface of the wheel holding member,
wherein the optical wheel comprises:
a first surface facing the first direction;
a second surface facing the second direction; and
a third surface extending from the second surface of the optical wheel in the first direction to define an annular space; and
a collective lens arranged in proximity to the optical wheel to face the first surface of the optical wheel,
wherein a distance along the axis of the motor shaft between the collective lens and the first surface of the optical wheel is equal to or less than a distance along the axis of the motor shaft between the collective lens and the projecting portion of the wheel holding member.

2. The optical wheel device according to claim 1,
wherein the projecting portion comprises an annular support ring having an outside diameter that coincides with an inside diameter of the annular space defined by the third surface of the optical wheel.

3. The optical wheel device according to claim 2,
wherein the recess is defined at least in part by a side surface of the annular support ring facing the motor shaft.

4. The optical wheel device according to claim 1,
wherein the recess defined by the wheel holding member is formed on the second surface of the wheel holding member, and
wherein an opening of the recess faces the second direction.

5. The optical wheel device according to claim 1, further comprising:
a balance material distributed in the recess defined by the wheel holding member to control a rotational balance of one or more of the optical wheel and the wheel holding member.

6. The optical wheel device according to claim 1,
wherein the wheel holding member further comprises:
a main body portion from which the projecting portion projects in the first direction,
wherein the main body portion defines a slit which is opened to an outer circumference of the main body portion and which is substantially parallel to a rotating plane.

7. The optical wheel device according to claim 1,
wherein the wheel holding member further comprises:
a main body portion from which the projecting portion projects in the first direction,
wherein the main body portion defines a cutout groove extending substantially parallel to the axis.

8. The optical device according to claim 7,
wherein the cutout groove is curved into a spiral shape from an outer circumference of the main body portion towards a rotational center of the main body portion.

9. The optical wheel device according to claim 1,
wherein the recess is formed into a cylindrical shape which is centered at a rotational center of the wheel holding member.

10. A projection system comprising:
a light source apparatus;
a display device which forms image forming light;
a light source-side optical system which guides light from the light source apparatus to the display device;
a projection-side optical system which projects the image forming light emitted from the display device onto a screen; and
a projection control circuit configured to control the light source apparatus and the display device,
wherein the light source apparatus comprises the optical wheel device according to claim 1.

11. The optical wheel device according to claim 1,
wherein the optical wheel further comprises a luminescent material layer formed on the first surface of the wheel holding member, and
wherein the collective lens is configured to:
collect a light emitted from a light source to the luminescent material layer of the optical wheel; and
collect a light emitted from the luminescent material layer of the optical wheel.

12. The optical wheel device according to claim 2,
wherein the optical wheel comprises:
a base material layer attached to the first surface of the wheel holding member, wherein the second surface of the optical wheel and the third surface of the optical wheel are provided by the base material layer; and
a luminescent material layer formed on the base material layer in the first direction, wherein the first surface of the optical wheel is provided by the luminescent material layer.

13. The optical wheel device according to claim 1,
wherein at least a portion of the motor extends in the first direction and is accommodated in the recess defined by the wheel holding member.

14. An optical wheel device comprising:
a motor;
a motor shaft extending from the motor, wherein the motor shaft extends along an axis in a first direction and a second direction opposite to the first direction;

a wheel holding member attached to the motor shaft to be rotated by the motor about the axis,
wherein the wheel holding member comprises:
a first surface facing the first direction;
a second surface facing the second direction; and
a projecting portion projecting past the first surface along the axis of the motor shaft in the first direction,
wherein the wheel holding member defines a recess which is centered at the motor shaft;
an optical wheel attached to the first surface of the wheel holding member,
wherein the optical wheel comprises:
a first surface facing the first direction;
a second surface facing the second direction; and
a third surface extending from the second surface of the optical wheel in the first direction to define an annular space; and
a collective lens arranged in proximity to the optical wheel to face the first surface of the optical wheel,
wherein a distance along the axis of the motor shaft between the collective lens and the first surface of the optical wheel is equal to or less than a distance along the axis of the motor shaft between the collective lens and the projecting portion of the wheel holding member, and
wherein the recess defined by the wheel holding member is formed on the first surface of the wheel holding member, wherein an opening of the recess faces the first direction.

15. The optical wheel device according to claim 14, wherein the wheel holding member further comprises a third surface extending along the axis of the motor shaft, and
wherein the third surface of the wheel holding member defines the recess that faces the first direction.

16. The optical wheel device according to claim 15, wherein a part of the third surface of the wheel holding member forms the projecting portion projecting past the first surface in the first direction.

17. The optical wheel device according to claim 14, wherein the projecting portion comprises an annular support ring having an outside diameter that coincides with an inside diameter of the annular space defined by the third surface the optical wheel.

18. The optical wheel device according to claim 17, wherein the recess is defined at least in part by a side surface of the annular support ring facing the motor shaft.

19. An optical wheel device comprising:
a motor;
a motor shaft extending from the motor, wherein the motor shaft extends along an axis in a first direction and a second direction opposite to the first direction;
a wheel holding member attached to the motor shaft to be rotated by the motor about the axis,
wherein the wheel holding member comprises:
a first surface facing the first direction;
a second surface facing the second direction; and
a projecting portion projecting past the first surface along the axis of the motor shaft in the first direction,
wherein the wheel holding member defines a recess which is centered at the motor shaft;
an optical wheel attached to the first surface of the wheel holding member,
wherein the optical wheel comprises:
a first surface facing the first direction;
a second surface facing the second direction; and
a third surface extending from the second surface of the optical wheel in the first direction to define an annular space; and
a collective lens arranged in proximity to the optical wheel to face the first surface of the optical wheel,
wherein a distance along the axis of the motor shaft between the collective lens and the first surface of the optical wheel is equal to or less than a distance along the axis of the motor shaft between the collective lens and the projecting portion of the wheel holding member, and
wherein at least a portion of the motor extends in the first direction and is accommodated in the recess defined by the wheel holding member.

20. The optical wheel device according to claim 19, wherein the recess defined by the wheel holding member is formed on the second surface of the wheel holding member.

* * * * *